March 12, 1957 A. L. SAXTON 2,784,803
CYCLONE SEPARATOR DIPLEG SEAL
Filed April 22, 1954

ARTHUR L. SAXTON INVENTOR
BY

United States Patent Office 2,784,803
Patented Mar. 12, 1957

2,784,803

CYCLONE SEPARATOR DIPLEG SEAL

Arthur L. Saxton, Warren Township, Somerset County, N. J., assignor to Esso Research and Engineering Company, a corporation of Delaware Application April 22, 1954, Serial No. 424,815

3 Claims. (Cl. 183—85)

This invention relates to a method and apparatus for separating finely divided solids from a gasiform fluid and more particularly relates to a method and apparatus for sealing a cyclone separator dipleg which extends at its lower end into a dense fluidized bed of finely divided solids.

The function and operation of centrifugal or cyclone separators is well known. Such separators have been employed extensively for separating finely divided solids from gasiform fluids in numerous industrial processes. In this type of separator, a suspension of finely divided solids in a gasiform fluid is generally continuously introduced tangentially through an inlet opening into the interior of a circular shaped housing wherein the suspension is swirled around so as to force the finely divided solid material by centrifugal action against the inner wall of the housing to thereby separate the finely divided solid material from the bulk of the gasiform fluid. The finely divided solid material separated at the inner wall of the housing falls downwardly in the housing due to the force of gravity through a small outlet opening at the bottom of the housing, and the gasiform material substantially free of entrained finely divided solids is removed through a centrally located large outlet opening at the top of the housing. Depending upon the value of the gasiform fluid, it may be recovered or vented to the atmosphere and similarly depending upon the value of the separated finely divided solids, they may be discarded or collected.

In recent years, separators of the centrifugal or cyclone type have been used extensively in such processes in the petroleum refining field as fluid catalytic cracking, fluid hydroforming, fluid coking, etc. In the above-mentioned processes a finely divided solid material having a size range of about 0 to 250 microns is employed as a catalyst and/or a heat-carrying medium. In these processes, the finely divided solids are normally maintained in the bottom of a reaction vessel in the form of a dense fluidized bed by passing a gasiform fluid such as air or hydrocarbon vapor upwardly therethrough at a superficial velocity of normally about 1 to 3 feet per second. However, in certain instances depending upon the particular size range and solids density of the finely divided solids, the superficial velocities employed may be in the range of 0.5-5 feet/second. Above the dense fluidized bed in the reaction vessel is a dilute phase comprising the rising gasiform fluid and a small amount of finely divided solids which have been entrained with the gasiform fluid from the dense bed. This rising dilute suspension is then normally passed through separators of the cyclone or centrifugal type arranged above the dense bed in order to recover substantially all of the entrained finely divided solids from the gasiform fluid because in general the finely divided solids are valuable for further utilization in the particular process. The separated solids are normally passed downwardly from the cyclone separator back to the dense fluidized bed from whence they originally came by means of a vertically arranged dipleg which communicates at its upper end with the bottom of the cyclone separator housing and at its lower end with the dense fluidized bed.

In certain installations, several cyclone separators may be employed in series in order to increase the effectiveness of recovery of the finely divided solids. In this type of installation the gasiform fluid leaving the initial cyclone separator which still contains a small amount of entrained finely divided solids is passed to a second cyclone separator wherein additional finely divided solids are removed from the gasiform fluid. This process may be continued as desired to recover additional finely divided solids. The separated solids are usually returned to the dense bed by means of separate diplegs for each separator in the series. In any type of installation the cyclone separator or separators employed may be arranged in the interior of or exterior to the reaction vessel depending upon the particular design selected with the dipleg or diplegs returning the separated finely divided solids back to the dense bed in the reaction vessel.

In most reaction vessel designs the dipleg of the cyclone separator is arranged to extend downwards below the upper level of the dense fluidized bed so that a definite seal is maintained between the dilute phase vapors and the lower end of the dipleg. The present invention is concerned with such an arrangement.

In the operation of such fluidized systems there will be a higher pressure existing in the dense bed than in the housing of the cyclone separator due to the unavoidable pressure drop of the gasiform fluid passing through the cyclone separator. Thus the separated solids to be returned to the dense bed from the cyclone separator via the dipleg must be passed from a zone of relatively low pressure to a zone of relatively high pressure. To overcome this pressure differential a column of fluidized finely divided solids is maintained within the cyclone separator dipleg which overcomes this unfavorable pressure differential. For proper operation of the dipleg of the cyclone separator, it is essential that a certain amount of gasiform fluid be passed upwardly in the dipleg countercurrent to the downward flow of the separated finely divided solids in order to maintain the finely divided solids in a fluidized condition to prevent the plugging of the dipleg by the finely divided solids. However, if the amount of this gasiform fluid or aerating gas is excessive, the separating efficency of the cyclone separator will be substantially reduced. This is because an excessive amount of aeration gas flowing upwardly in the dipleg at a high velocity will entrain with it a substantial amount of the finely divided solids which may then subsequently pass through the upper outlet of the cyclone separator together with the gasiform fluid and be lost from the reaction vessel.

Because this need for regulating the amount of aeration gas in the dipleg of the cyclone separator has been previously recognized, a number of prior art devices have been developed in an attempt to remedy this problem. In one prior are device, for example, the lower end of the dipleg of the cyclone separator has been arranged to communicate with the throat of a venturi tube through which a gas is passed from a conduit connecting to an external source of gas. The effect of this particular arrangement is to reduce the flow of gasiform material up the dipleg from the dense fluidized bed. The gas passed through the venturi tube from the external source is normally discharged together with the separated finely divided solids into the interior of the reaction vessel. In another prior art device, steam is jetted downwardly into the dipleg of the cyclone separator to thereby prevent the gasiform material which is rising from the dense bed from entraining an excessive amount of finely divided solids up the dipleg. The steam required is obtained from an external source and is conducted to the jetting means at the dipleg by means of a special conduit. In still another prior art device, a cup-like member is spaced around the lower end of the dipleg so as in effect to shield the dipleg from the relatively high velocity gasiform fluid passing upwardly through the dense fluidized bed. In this particular apparatus, a controlled amount of aeration gas is introduced into the bottom of the cup-like member from a conduit extending to an external source of aeration gas. The separated catalyst flowing down the dipleg in this prior art apparatus flows down the cyclone dipleg into the shielding cup and overflows from the cup around the outside of the dipleg into the dense fluidized bed.

A limitation on the operation of these prior art devices is that they are dependent upon an external source of aeration gas. Thus, for example, the operation of these devices is subject to interruption in case of a failure of the utility system supplying the aeration gas, in which event the cyclone separator dipleg could readily become plugged, with the result that a substantial quantity of finely divided solids would be lost from the reaction vessel in the gasiform fluid exiting from the cyclone separator. Also because the conduit member carrying the aeration gas from the external source must necessarily extend into the interior of the reaction vessel, the conduit member is subject to thermal expansion, vibration and erosion. Therefore, in the event that the conduit member should become broken due either to vibration, thermal expansion, erosion, etc., the operation of the prior art devices would also be interrupted so that again the dipleg could readily become plugged with finely divided solids. In addition, it is of course obvious that the complicated construction of the prior art devices increases the cost of the reaction vessel due to the complexity of the equipment required. Also, in many instances the introduction of the additional gas required to operate the prior art devices may have a deleterious effect on the reaction being conducted in the reaction vessel. And finally the introduction of additional gas into the reaction vessel will increase the gas load of the cyclone separators thus necessitating larger and more expensive separators.

The present invention is designed to overcome these disadvantages of the prior art devices. Briefly, the instant invention comprises a preferably cylindrically-shaped, hollow seal pot which is axially aligned with the dipleg of a cyclone separator and which overlaps the lower end of the cyclone separator dipleg in radial spaced relation thereto. The upper end of the seal pot is open to permit finely divided solids flowing into the interior of the seal pot from the dipleg to flow out of the seal pot into the dense fluidized bed through the annular opening formed between the bottom of the dipleg and the upper portion of the seal pot. The lower end of the seal pot is provided with a bottom enclosing surface which is axially spaced from the bottom of the dipleg and which is provided with an number of preferably symmetrically spaced openings. The seal pot is supported by connecting means to the lower end of the cyclone separator dipleg which is arranged in this invention below the upper level of the dense fluidized bed contained in a reaction vessel. In the operation of the present invention, a certain amount of the gasiform fluid passing up through the dense fluidized bed in the reaction vessel passes upwardly into the bottom of the seal pot through the openings in the bottom enclosing surface of the seal pot. The particular amount of gasiform material entering the seal pot from the dense bed is dependent upon the relationship between the open area in the bottom enclosing surface and the total cross-sectional area of the seal pot. It is therefore possible to assure a proper aeration gas velocity in the cyclone separator dipleg if the superficial velocity to be employed in the reaction vessel is preknown. Thus, in the present invention the dipleg of the cyclone separator is aerated by means of the gasiform fluid passing upwardly through the dense fluidized bed rather than by aeration gas introduced from external sources.

It is an object of this invention to provide a method and apparatus for reducing catalyst losses from cyclone separators which are employed to separate finely divided solids entrained in a gasiform fluid rising from a dense fluidized bed.

It is a further object of this invention to provide a simple, dependable, and inexpensive method and apparatus for sealing the dipleg of a cyclone separator.

It is a still further object of this invention to provide a method and apparatus for sealing the dipleg of a cyclone separator which does not require an external source of aeration gas.

Other objects of this invention will be apparent from a reading of the specification which will be best understood when read in conjunction with the drawings in which.

Figure 1:
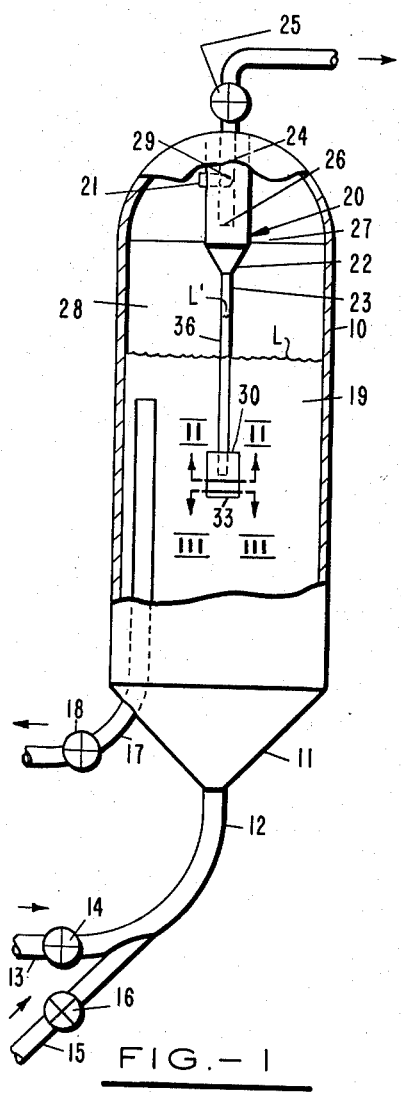
Fig. 1 is a diagrammatic view shown in partial cross-section of a vessel provided with a cyclone separator for separating finely divided solids entrained from a dense fluidized bed in which a sealing apparatus made in accordance with the present invention is employed in conjunction with the dipleg of the cyclone separator.

Referring now to Fig. 1, reference numeral 10 designates a vessel adapted to carry out the contacting of a gasiform fluid with a finely divided solid as, for example, a reactor or regenerator employed in a fluid catalytic cracking, fluid hydroforming or fluid coking process. Vessel 10 is preferably circular in cross section and may be provided with a conical bottom section 11 at its lower end. Communicating with the bottom of vessel 10 is conduit 12 which is adapted to convey a mixture of a gasiform fluid and finely divided solids into the bottom of vessel 10. The finely divided solids in a fluidized condition are introduced into conduit 12 through conduit 13 and their rate of introduction is controlled by means of valve 14 in conduit 13. The finely divided solids may have a size up to about 250 microns in average diameter although normally substantially all of the finely divided solids will have a size of about 20 to 100 microns. A gasiform fluid, which may be air, hydrocarbon vapors, etc., as the case may be, is introduced into conduit 12 through conduit 15 and its rate of introduction is controlled by means of valve 16 in conduit 15. The gasiform fluid is introduced into vessel 10 through conduit 12 at such a rate that its superficial velocity upwards through vessel 10 will normally be about 1 to 3 feet per second. At these superficial velocities, the finely divided solids will be maintained in the bottom of vessel 10 as a dense fluidized bed 19 having a relatively well-defined upper level L.

In processes such as fluid catalytic cracking, fluid hydroforming, fluid coking, etc., finely divided solids are continuously introduced into vessel 10. Simultaneously in these processes a certain amount of finely divided solids are continuously removed from dense fluid bed 19. In this particular embodiment of the present invention, finely divided solids may be continuously withdrawn from dense bed 19 in vessel 10 by means of conduit 17 and their rate of removal is controlled by means of valve 18 in conduit 17. The finely divided fluidized solids flow downwards in conduit 17 similar to a liquid due to the force of gravity.

In the fluid hydroforming and fluid catalytic cracking conversion processes, for example, wherein a finely divided catalyst is continuously contacted with a hydrocarbon vapor in a reactor and a deposit of coke is laid down therein on the finely divided catalyst, the resultant spent catalyst is continuously withdrawn from the reactor and passed to a regenerator wherein a major portion of the carbon or coke deposits is burned off the catalyst. In the regenerator the catalyst is also maintained generally as a dense fluid bed in the bottom thereof by passing an oxygen-containing gas, which is usually air, upwardly therethrough at a superficial velocity of about 1 to 3 feet/second. After the finely divided catalyst has been regenerated, it is again passed back to the reactor portion of the system wherein the freshly regenerated catalyst is employed to convert further hydrocarbon vapors. Thus, for the purposes of this invention, vessel 10 may be considered to be a hydroforming or cracking reactor wherein a finely divided catalyst is contacted with hydrocarbon vapors with the spent catalyst formed in the reaction being passed by means of conduit 17 to a regenerator (not shown) and the freshly regenerated catalyst produced in the regenerator being continuously passed back to vessel 10 by means of conduit 13. Similarly, vessel 10 may be considered to be a regenerator employed in a catalytic cracking or hydroforming process in which spent catalyst is introduced through conduit 13 and air is introduced through conduit 15 into vessel 10 with freshly regenerated catalyst being removed from vessel 10 by means of conduit 17 for passage to its associated reactor.

In any event, the gasiform fluid is passed upwardly within vessel 10 at a superficial velocity of about 1 to 3 feet/second with a certain small amount of the finely divided solids being entrained into dilute phase 28 with the rising gasiform fluid. In order to separate these entrained finely divided solids from the gasiform fluid, the dilute suspension is passed to cyclone separator 20 which is arranged in the upper portion of vessel 10 through tangentially located inlet pipe 21 which communicates with the interior of housing 27 of cyclone separator 20 through opening 29. Housing 27 of cyclone separator 20 is circular in cross section and may be cylindrical as shown in Fig. 1.

Upon entering the interior of housing 27, the dilute suspension is swirled around therein with the finely divided solids being forced against the interior wall of housing 27 due to the centrifugal action resulting from the swirling motion. The finely divided solids fall downwardly along the interior wall of housing 27 due to the force of gravity and pass through restricted section 22 of housing 27 which communicates at its lower end with dipleg 23 which extends down into dense bed 10 below upper level L. A column 36 of the separated finely divided solids is maintained in the lower portion of dipleg 23 to balance the difference in pressure existing between the interior of cyclone separator 20 and dense bed 19 at the lower end of dipleg 23. This column of solids which is shown as having an upper level L' in dipleg 23, provides a seal between these two zones of different pressure. The gasiform fluid from which the finely divided solids have been separated passes upwardly through opening 26 of outlet pipe 24 which is employed to conduct the gasiform fluid to the atmosphere or to heat exchange and/or recovery equipment. Outlet pipe 24 contains valve 25 which may be operated if desired to control the pressure existing in vessel 10.

It is essential, as previously described, to provide a certain amount of aerating gas for the finely divided solids passing downwardly through dipleg 23 so as to maintain column 36 of the finely divided solids in a fluidized state to prevent plugging of dipleg 23. However, by merely extending dipleg 23 down into dense bed 19, an excessive amount of aeration gas would be passed up dipleg 23 from the rising gasiform fluid in vessel 10 and a substantial amount of finely divided solids would be entrained upwardly into cyclone separator 20 with this fluid. In order to prevent this undesirable effect which would substantially decrease the separating efficiency of cyclone separator 20, seal pot 30 is provided at the lower end of dipleg 23 to control the amount of aeration gas introduced from bed 19 into the bottom of dipleg 23. Seal pot 30 comprises a preferably cylindrical housing 31 which is aligned with dipleg 23 and which overlaps the lower end of dipleg 23 in radial spaced relation thereto as shown in Fig. 1.

Figure 2:
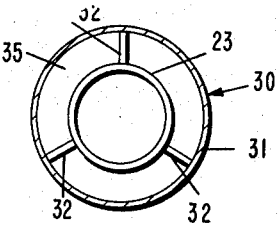
Fig. 2 is an enlarged detailed, horizontal, cross-sectional view of the sealing apparatus of the present invention taken along the line II—II of Fig. 1 looking in the direction of the arrows.

Referring now to Fig. 2, a detailed showing is made of the relationship between dipleg 23 and seal pot 30. It will be noted that seal pot 30 is rigidly supported in concentric spaced relation to the lower end of dipleg 23 by means of supports 32 which are designed such that they do not represent a substantial restriction of annular opening 35 formed between dipleg 23 and seal pot 30. Although three bar supports arranged 120° apart are indicated in Fig. 2, it is to be clearly understood that any suitable connecting means may be employed which will not cause an undue restriction of annular passage 35.

Figure 3:
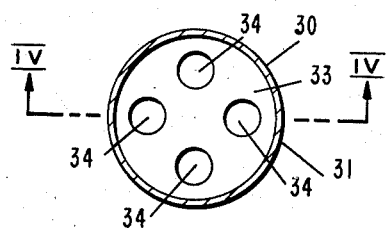
Fig. 3 is another enlarged detailed, horizontal, cross-sectional view of the sealing apparatus of this invention taken along the line III—III of Fig. 1 looking in the direction of the arrows.
Figure 4:
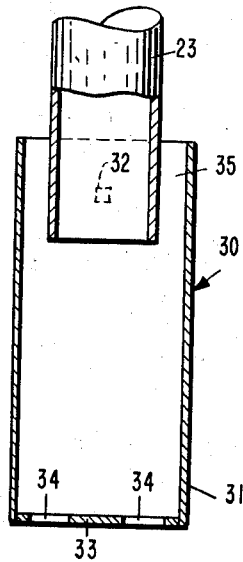
Fig. 4 is an enlarged detailed, vertical cross-sectional view of the sealing apparatus of the present invention taken along the line IV—IV of Fig. 3 looking in the direction of the arrows.

Referring now to Figs. 3 and 4, it will be seen that housing 31 of seal pot 30 is provided with a bottom enclosing wall member or surface 33 which has a number of openings 34 therein. The purpose of openings 34 is to permit a certain amount of the gasiform fluid rising upwardly in dense bed 19 to flow therethrough into the interior of seal pot 30. Because the open area of openings 34 is less than the cross-sectional area of seal pot 30, the velocity of the rising gasiform fluid will be maintained at a lower rate in seal pot 30 than in dense fluid bed 19. A portion of this reduced velocity gasiform fluid passing upwardly through seal pot 30 passes upwardly at substantially the same reduced velocity through dipleg 23 to thereby provide the necessary aeration for dipleg 23. The remainder of the gasiform fluid passing upwardly through seal pot 30 flows upwardly out of seal pot 30 into dense bed 19 through annular passageway 35. In the operation of the present invention, the finely divided solids which are flowing downwardly in dipleg 23 pass from dipleg 23 into the interior of seal pot 30 and thereafter may be said to overflow from the interior of seal pot 30 through annular passageway 35 into dense fluid bed 19. In this way, the apparatus of the present invention provides a proper amount of aeration gas for dipleg 23, without the necessity of an external supply of aerating gas, by employing a portion of the gasiform fluid in vessel 10 to perform this particular function. It is to be understood that a single opening may be employed in bottom enclosing surface 33, if desired; however, in general, it is preferable to employ a plurality of symmetrically spaced openings so as to obtain a more uniform distribution of the aeration gas from the dense bed in the interior of seal pot 30.

The particular dimensions of seal pot 30 will depend upon the diameter of dipleg 23 and the superficial velocity of the gasiform fluid in the interior of vessel 10. Thus, if the diameter of dipleg 23 is known, a diameter for seal pot 30 is selected such that annular passage 35 formed between the lower end of dipleg 23 and housing 31 of seal pot 30 is sufficient to permit free flow of the finely divided solids from seal pot 30 into dense fluid bed 19. Normally in large commercial installations where the cyclone separator dipleg has a diameter of about 6", for example, the diameter of seal pot 30 need be only about 2–6" larger than the diameter of dipleg 23 to provide a sufficient opening which will not constitute a restriction to the flow of finely divided solids from seal pot 30 into dense fluid bed 19. The diameter of the seal pot 30 is at least 1.25 times the diameter of dipleg 23. Expressed in another way, the diameter of seal pot 30 should be from about 25–100% greater than the diameter of dipleg 23. Normally any larger diameter for seal pot 30 will not be required for the successful operation of the present invention and the utilization of a larger diameter may represent an unnecessary impediment to the flow of the gasiform fluid in vessel 10.

It has been found that a superficial velocity of about 0.1–0.5 feet/second in seal pot 30 and in dipleg 23 is necessary to provide suitable aeration for column 36 of the finely divided solids in dipleg 23. The exact velocity required in sealpot 30 and in dipleg 23 in the range of 0.1–0.5 ft./second will depend to some extent upon the size and solids density of the finely divided solids employed in vessel 10. In order to determine the total open area required in bottom enclosing surface 33 of seal pot 30 to produce the required aeration velocity, the following relationship may be employed:

Open area of surface 33 =

$$\frac{\text{velocity in seal pot 30}}{\text{velocity in bed 19}} \begin{pmatrix} \text{cross-sectional} \\ \text{area of seal} \\ \text{pot 30} \end{pmatrix}$$

It is evident from this relationship that housing 31 of seal pot 30 need not be cylindrical as shown in the drawings and thus may have a different shape if desired as long as the particular shape employed provides approximately the above relationship. Such other shapes will be apparent to those skilled in the art. It is to be clearly understood that the term "cross-sectional area of seal pot 30" refers to the horizontal area defined by the interior wall of housing 31 of seal pot 30. Normally the velocity of the gasiform fluid flowing upwardly in vessel 10 will be known from the design conditions for vessel 10 so that the open area of surface 33 may be readily calculated to provide a seal pot velocity in the range of about 0.1–0.5 feet/second. If the superficial velocities in vessel 10 fluctuate frequently between about 1 and 3 feet/second, then about 10–15% open area in surface 33 will provide the required range of aeration velocities for dipleg 23 at all times for these varied operating conditions. On the other hand, if the superficial velocity in vessel 10 is known to be relatively constant within the range of 1 to 3 feet/second, then the open area may be selected more accurately and may vary from about 3–50% depending upon the vessel velocity employed and the aeration gas velocity desired.

The amount of open area required in bottom enclosing surface 33 which is determined from the above-indicated relationship is then distributed among several preferably circular openings 34 in bottom surface 33. Openings 34 should be selected to be sufficiently large to preclude the possibility of becoming plugged not only by the finely divided solids but also by foreign objects such as broken fragments of the reactor lining, etc. Normally a diameter of about 1–2" for openings 34 in commercial installations will be sufficient to preclude this possibility of plugging. Openings 34 are preferably arranged symmetrically in bottom surface 33 to provide uniform distribution of the aerating gas passing upwardly therethrough into seal pot 30.

Now in regard to the depth of seal pot 30 below the bottom of dipleg 23, this dimension should be at least about four times the diameter of one of openings 34 to assure a uniform aeration gas velocity in seal pot 30 at the bottom of dipleg 23. The upper end of seal pot 30 is constructed to overlap the lower end of dipleg 23 a slight amount to provide a positive seal between dense fluid bed 19 and the lower end of dipleg 23. Normally in large commercial installations an overlap of about 1 to 2", for example, is sufficient to provide this seal. However, it is to be understood that the amount of overlap may be greater than this if desired.

The following example is given to illustrate the design of the apparatus of the present invention. However, it is to be clearly understood that the present invention is not to be limited to this particular example. A finely divided silica-alumina cracking catalyst comprising 88% silica and 12% alumina and having a size range of about 20–100 microns is maintained in the bottom of a catalystic cracking reactor in the form of a dense bed by passing a hydrocarbon gas oil vapor upwardly therethrough at a superficial velocity of about 1.8 feet/second. The reactor is about 20 feet in diameter and about 80 feet tall. In passing through the dense fluid bed of finely divided catalyst the hydrocarbon gas oil is converted to lower boiling products and coke which is deposited on the finely divided catalyst. Finely divided catalyst and hydrocarbon vapors are continuously passed into the bottom of the reactor and a portion of the finely divided catalyst in the dense bed is continuously withdrawn therefrom for passage to a regenerator. The converted lower boiling hydrocarbon products flowing upwardly from the dense bed pass into a dilute phase above the dense bed and in doing so entrain a small amount of finely divided catalyst. This dilute suspension is then passed to a conventional cyclone separator which is provided with a dipleg having a diameter of about 6" which extends down into the dense bed to a point about 7' below the upper level of the dense bed. In accordance with the present invention, a cylindrically shaped, hollow seal pot is arranged about the lower end of the dipleg in overlapping spaced relation thereto. The diameter of the seal pot is about 12" and its length about 3'. The seal pot is aligned below the dipleg and is arranged to have the upper end of the seal pot overlap the lower end of the dipleg by about 5". The circular bottom surface of the seal pot is provided with four symmetrically spaced holes of 2" diameter centered at about 3½" from the center of the circular bottom enclosing surface. Because the superficial velocity of the hydrocarbon vapors in the reactor is about 1.8 feet/second and the relationship of cross-sectional area of the seal pot to open area in the bottom enclosing surface is 9:1, the superficial velocity of the aeration gas in the interior of the seal pot will be about 0.2 feet/second so that the dipleg will be provided with an aeration gas of proper velocity, namely about 0.2 feet/second. It will be noted that a change of 0.9 feet/second in the superficial velocity in the reactor will change the aeration gas velocity in the dipleg by about 0.1 feet/second so that suitable dipleg aeration will be obtained with this particular seal pot over the range of bed velocities which could normally be expected in the reactor operation. Thus for superficial velocities in the reactor of 0.9 and 2.7 feet/second, the dipleg aeration velocities will be about 0.1 and 0.3 feet/second, respectively.

It is to be understood that the present invention is applicable to installations employing several cyclone separators in series in which case the dipleg of one or more of the separators may be equipped with a seal pot made in accordance with the present invention. It is also to be understood that the present invention is applicable to vessel designs wherein the separation apparatus is arranged exterior to the vessel. In fact, the present invention is applicable to any situation wherein it is necessary to introduce finely divided solids into a dense fluidized bed of finely divided solids from a zone of lower pressure.

What is claimed is:

1. In combination with a dipleg of a cyclone separator, a hollow cylindrically shaped seal pot axially aligned with and having its upper open end arranged about the lower end of said dipleg in overlapping spaced relation thereto, said seal pot having a diameter at least about 1.25 times the diameter of said dipleg and said seal pot overlapping the lower end of said dipleg by at least about 1", said seal pot being provided with a flat horizontal bottom enclosing wall having a plurality of symmetrically spaced circular openings therein which provide a total open area of at least about 3% of the horizontal cross-sectional area of said seal pot, said openings having a diameter of at least about 1", said bottom enclosing wall being spaced beneath the bottom of said dipleg a distance equal to at least about 4 times the diameter of one of said openings.

2. In combination with a vessel adapted to maintain finely divided solids as a dense fluidized bed in the lower portion thereof and a cyclone separator adapted to separate entrained finely divided solids from a gasiform fluid passed through said dense fluidized bed, said cyclone separator being provided with a dipleg which extends into the lower portion of said vessel and down into said dense fluidized bed and which is adapted to return separated finely divided solids from said cyclone separator to said dense fluidized bed, sealing means adapted to aerate the separated finely divided solids in said dipleg, which means comprises a hollow cylindrically shaped seal pot axially aligned with and having its upper open end arranged about the lower end of said dipleg in overlapping spaced relation thereto, said seal pot being submerged in the fluidized bed and being provided with a flat bottom enclosing wall having a plurality of symmetrically spaced openings adapted to pass gasiform fluid from said dense fluidized bed into said seal pot, the overlapping portions of said seal pot and said dipleg forming an annular opening therebetween adapted to pass fluidized solids from said seal pot to said dense fluidized bed.

3. In combination with a vessel adapted to maintain finely divided solids as a dense fluidized bed in the lower portion thereof and a cyclone separator adapted to separate entrained finely divided solids from a gasiform fluid passed through said dense fluidized bed, said cyclone separator being provided with a dipleg which extends into the lower portion of said vessel and down into said dense fluidized bed and which is adapted to return separated finely divided solids from said cyclone separator to said dense fluidized bed, sealing means adapted to seal the bottom outlet end of said dipleg and to aerate the separated finely divided solids in said dipleg, said sealing means including a hollow cylindrically shaped seal pot axially aligned with and having its upper end arranged about the bottom outlet end of said dipleg in overlapping spaced relation thereto, said seal pot being submerged in the fluidized bed and being provided with a substantially flat bottom enclosing wall having a plurality of spaced openings therein, said openings being adapted to pass gasiform fluid from the dense fluidized bed into said seal pot to fluidize solids therein, said openings having an open area selected to reduce the velocity of the upflowing gasiform fluid passing from the fluidized bed into said seal pot and into said dipleg for fluidizing solids therein, the overlapping portions of said seal pot and said dipleg forming an annular opening adapted to return fluidized solids from said seal pot to the dense fluidized bed.

References Cited in the file of this patent

UNITED STATES PATENTS

| | | |
|---|---|---|
| 2,515,155 | Munday | July 11, 1950 |
| 2,656,242 | Matheson | Oct. 20, 1953 |

FOREIGN PATENTS

| | | |
|---|---|---|
| 271,545 | Great Britain | May 17, 1927 |